US010673941B2

(12) United States Patent
Casaletto et al.

(10) Patent No.: US 10,673,941 B2
(45) Date of Patent: Jun. 2, 2020

(54) ELASTIC REPLY-REQUEST MULTICAST MESSAGING PROTOCOL FOR PEER-TO-PEER DISTRIBUTED SYSTEMS

(71) Applicant: VMware, Inc., Palo Alto, CA (US)

(72) Inventors: Holly Casaletto, Sunnyvale, CA (US); Christopher Gilliard, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 148 days.

(21) Appl. No.: 15/192,664

(22) Filed: Jun. 24, 2016

(65) Prior Publication Data
US 2017/0374141 A1    Dec. 28, 2017

(51) Int. Cl.
| | | |
|---|---|---|
| G06F 15/16 | (2006.01) | |
| H04L 29/08 | (2006.01) | |
| H04L 12/58 | (2006.01) | |
| H04L 12/803 | (2013.01) | |
| H04L 12/18 | (2006.01) | |

(52) U.S. Cl.
CPC ........ *H04L 67/1095* (2013.01); *H04L 47/125* (2013.01); *H04L 51/02* (2013.01); *H04L 67/10* (2013.01); *H04L 12/1886* (2013.01)

(58) Field of Classification Search
CPC ....... H04L 12/18; H04L 47/125; H04L 51/02; H04L 51/04; H04L 67/104; H04L 67/1095
See application file for complete search history.

(56) References Cited

U.S. PATENT DOCUMENTS

| | | | | |
|---|---|---|---|---|
| 2004/0153511 | A1* | 8/2004 | Maynard | G06F 9/546 709/206 |
| 2005/0281208 | A1* | 12/2005 | Dorenbosch | H04L 12/189 370/270 |
| 2007/0011349 | A1* | 1/2007 | Gaug | G06Q 10/107 709/238 |
| 2010/0217852 | A1* | 8/2010 | Nishida | H04M 1/72525 709/223 |
| 2010/0296515 | A1* | 11/2010 | Kishi | H04L 67/125 370/395.53 |
| 2012/0026279 | A1* | 2/2012 | Kato | H04N 7/15 348/14.08 |
| 2015/0334015 | A1* | 11/2015 | Savolainen | H04L 61/25 370/392 |

\* cited by examiner

*Primary Examiner* — Suraj M Joshi
*Assistant Examiner* — Ayele F. Woldemariam
(74) *Attorney, Agent, or Firm* — Loza & Loza, LLP (57) ABSTRACT

Techniques disclosed herein provide a messaging protocol for a distributed system. In one embodiment, each message constructed according to the messaging protocol includes a field for a list of globally unique identifiers (GUIDs) of nodes that should not reply to the message. A new node joining the system sends a message requesting system state information and including an empty GUID list, indicating that all nodes receiving the message should reply. In normal operation, the system's state information is synchronized among all nodes at regular intervals by exchanging messages indicating local state changes at each node, and including GUID list fields specifying all other nodes' GUIDs so that no nodes reply. A node which identifies messages that should have been received from another node but are missing transmits a message requesting the missing messages, with a GUID list including all nodes other than the other node that sent the missing messages.

18 Claims, 4 Drawing Sheets

ELASTIC REPLY-REQUEST MULTICAST MESSAGING PROTOCOL FOR PEER-TO-PEER DISTRIBUTED SYSTEMS

BACKGROUND

A distributed system is a system in which components execute concurrently to achieve a common goal. The components of distributed systems typically communicate through message passing. Maximizing the performance of such communication can be important for efficiently achieving the common goal of the distributed system.

The most common network configurations in distributed systems are master/slave and peer-to-peer configurations. In a master/slave configuration, one node acts a master node by establishing timing and controlling communications with slave nodes, typically through a request-and-reply model (or a multicast request followed by individual replies). However, in such a configuration, the slave nodes are unable to initiate communications with the master node or with each other, and the master node's failure affects overall system communication, i.e., the master node is a single point of failure.

By contrast, nodes in a peer-to-peer configuration are each able to initiate communications with other nodes when there is a need for data exchange, and such communications may be through the request-and-reply model or with all peers through a multicast model. Although the peer-to-peer configuration does not have a single point of failure, use of the request-and-reply model may result in heavy network traffic that decreases communication performance. For example, to synchronize data among N nodes, each of the N nodes needs to transmit a request for information to the other nodes, and each of the N nodes also needs to reply to requests from N−1 other nodes, giving a total of N requests+N*(N−1) replies, or $N^2$, messages. Multicast may be used to address this performance issue with the request-and-reply model by sending messages to a group of recipients at a time. However, traditional multicast does not guarantee the delivery of messages or their delivery order, so data may not be successfully synchronized among the nodes of the distributed system.

SUMMARY

One embodiment provides a method for a node in a distributed system to process a message. The method generally includes receiving the message, where the message includes a request and identifiers of all nodes in the distributed system from which replies are not required. The method further includes, responsive to determining that the received message does not include an identifier associated with the node: processing the request, and transmitting a reply to the request.

Further embodiments include a non-transitory computer-readable storage medium storing instructions that when executed by a computer system cause the system to perform the method set forth above, and a system programmed to carry out the method set forth above.

DETAILED DESCRIPTION

Embodiments presented herein provide an elastic reply-request multicast (ERRM) messaging protocol for a peer-to-peer distributed system. Messages constructed according to such a protocol are elastic in the sense that the messages are forwarded to all nodes in the system but replies are required only as needed. This elastic messaging approach has the multicast model's advantage of sending messages to groups of nodes, but also the request-and-reply model's advantage of guaranteeing delivery and ordering of messages, by requiring those nodes which have not previously replied to a request or which have sent out-of-order messages to reply to the current message.

In one embodiment, each message includes a field reserved for a list of globally unique identifiers (GUIDs) of nodes that do not need to reply to the message. Upon joining the distributed system, a new node sends a message with (1) a request for system state information needed to initialize the new node, and (2) an empty GUID list, indicating that all nodes receiving the message should reply. A message broker forwards such a message to all other nodes in the system, which respond with locally maintained state information that is then used by the new node to obtain the current system state. Further, the new node identifies the GUIDs of responding nodes (from, e.g., a GUID field in the reply message) and uses the identified GUIDs to construct the GUID list field of subsequent messages so that nodes that provide requested information are not required to reply again to retry messages. After new nodes are initialized, the distributed system may enter normal operation in which the system state is synchronized among all nodes at regular intervals by exchanging messages that indicate local state changes at each of the nodes. Such exchanged messages may include GUID list fields specifying all other nodes' GUIDs, making the messages essentially multicast messages that do not require replies from any receiving nodes. The normal operation may be interrupted when a node detects that it is missing messages from other nodes (e.g., based on an out-of-order numbering in received messages that should be consecutively numbered), and the detecting node may then send, for each such other node, a message requesting the missing message(s) from that other node, with a GUID list including all nodes other than that other node.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
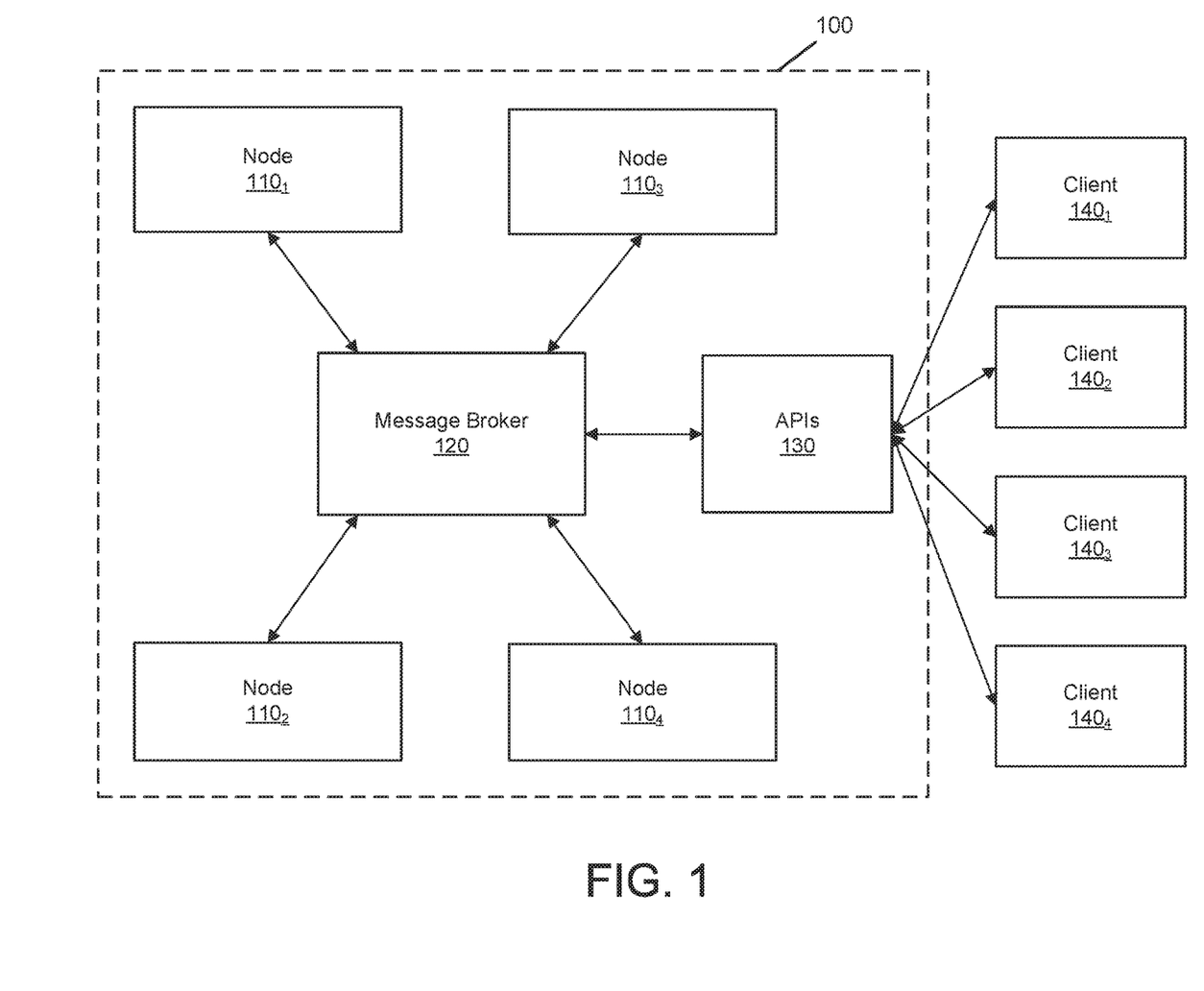
FIG. 1 illustrates components of a system in which an embodiment may be implemented.

FIG. 1 illustrates components of a system 100 in which an embodiment may be implemented. As shown, system 100 is a peer-to-peer distributed system with nodes 110 in communication with each other via a message broker 120. Although four nodes $110_{1-4}$ are shown, it should be understood that distributed system 100 may include any number of nodes 110. Clients 140 communicate with nodes 110 via a network (e.g., the Internet) by invoking APIs 130 (via, e.g., TCP messages) to request services from nodes 110. Illustratively, client requests are routed through message broker 120, which may also serve as a load balancer that distributes client requests to appropriate nodes 110.

In one embodiment, nodes 110 may contribute substantially equally to achieving a common computing goal, such as servicing clients 140. Each of nodes 110 further maintains local state data that is periodically exchanged with every other node 110 in distributed system 100 to synchronize the overall system state data. For example, the state data may include counts of the number of times clients have been serviced, and such counts may be exchanged in every predefined time interval so that each node 110 knows the total count of times that each client has been serviced by distributed system 100. The total count for a particular client may then be compared to a quota set for the client to determine whether the client is permitted to request further services from distributed system 100 in a given time period. Although counts are used herein as a reference example, it should be understood that any other type of data may also be exchanged among nodes 110. It is assumed herein that only eventual state data consistency is required, i.e., that distributed system 100 is able to tolerate transient data inconsistencies during predefined time intervals.

Each of nodes 110 represents a server computer (or another type of computer) constructed on a conventional hardware platform. The hardware of such a server (or other) computer may include CPU(s), a memory, network interface controller(s) (NICs), and an I/O device interfaces, among other things. Although discussed herein with respect to nodes 110 communicating with each other using an ERRM messaging protocol, it should be understood that such communications may actually be performed by applications running in the server (or other) computers, or any other feasible software or hardware component of the server (or other) computers. Similarly, message broker 120 may be a server (or other) computer running an application (or other software or hardware) that routes messages between nodes 110, as well as between nodes 110 and clients 140. In another embodiment, message broker 120 may run in one of the nodes 110. In yet other embodiments, nodes 110 may include virtualized computing systems hosting virtual machines (VMs) or containers that service requests from clients 140, or the nodes 110 themselves may be VMs or containers.

Nodes 110 are configured to subscribe to topics with message broker 120, indicating their interest in receiving messages having those topics. In turn, message broker 120 forwards messages having each topic to nodes which have subscribed to the topic. For example, a topic may be subscribed to by all nodes 110 in distributed system 100. Such a topic may be used by new nodes to send messages to all other nodes 110 requesting system state information needed for initialization, and such a topic may also be used by nodes 110 in normal operation to send messages at regular intervals to distribute local state information to other nodes 110 for synchronization purposes, and by nodes 110 to request missing messages that have been sent by other nodes but not yet received.

In one embodiment, messages may be constructed according to the ERRM protocol. As previously noted, such messages are elastic in that replies are required only as needed. Each message may include a field reserved for a list of GUIDs of nodes that should not reply to the message. As discussed in greater detail below, a new node joining distributed system 100 may send a message requesting system state information and including an empty GUID list, indicating that all nodes receiving the message should reply with their locally maintained state information. In normal operation after new nodes have joined distributed system 100, the system's state information may be synchronized among all nodes 110 by exchanging messages at regular intervals, with the messages indicating local state changes at each node and including GUID list fields specifying all other nodes' GUIDs so that no other nodes reply to the messages. In addition, a node which identifies messages that should have been received but are missing may transmit, for each node which sent missing message(s), a respective request for the missing message(s) sent by that node and including a GUID list specifying all nodes other than that node.

Figure 2:
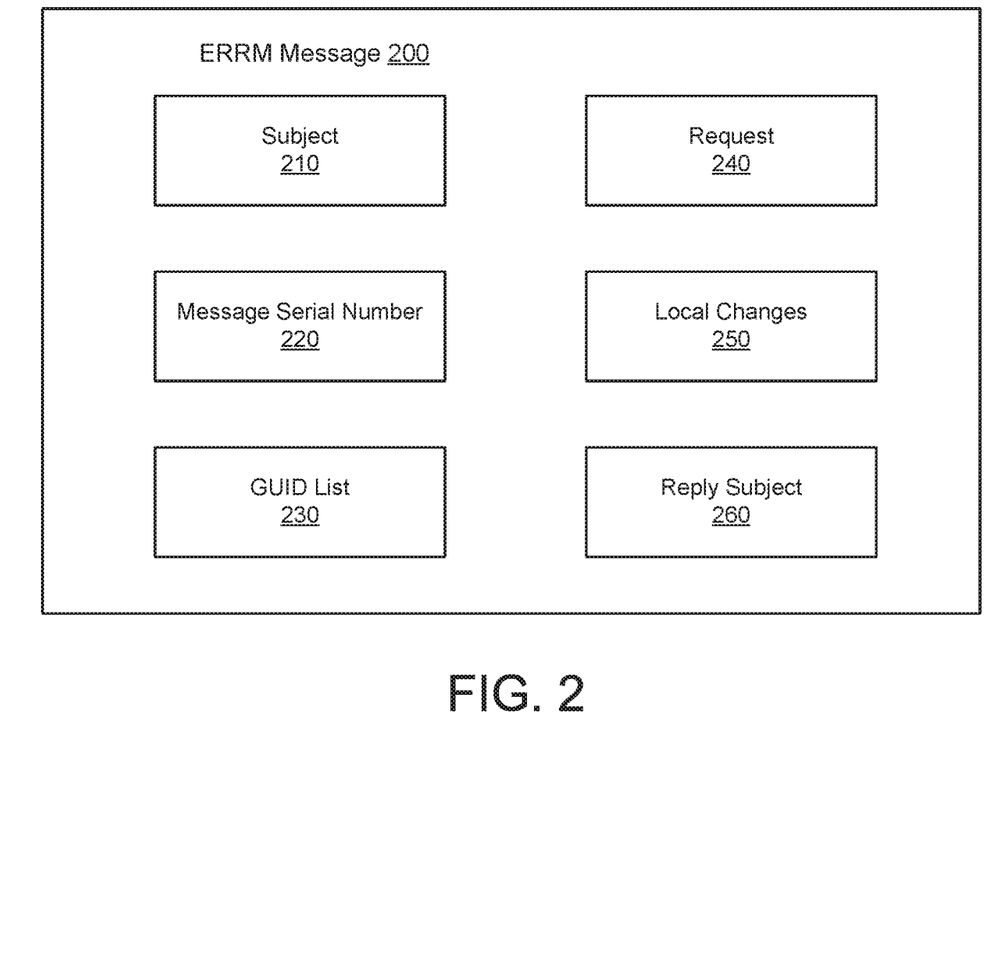
FIG. 2 illustrates contents of a message, according to an embodiment.

FIG. 2 illustrates contents of an ERRM message 200, according to an embodiment. As shown, message 200 includes a subject field 210, a serial number field 220, a GUID list field 230, a request field 240, a local changes field 250, and a reply subject field 260. An example of such a message 200 in JavaScript Object Notation (JSON) format is as follows:

```
{
    "subject":"emitter.data.inbound.>",
    "message_serial_number":"CC4EE3AF921F0E1A_00000111",
    "GUIDList":{
        "DF3TY2QJ068D1T4U",
        "YR2HH6PO57W33TT",
        .....,
        "RBN345UTOK374TM"
        },
    "request":"emit data map of the whole system",
    "local changes":"localEmitCount=2515, .....",
    ........ ,
    "reply subject":"CC4EE3AF921F0E1A.reply"
}
```

It should be understood that message formats other than JSON may also be used.

Subject field 210 specifies the subject of the message, which may be one of a number of topics that nodes 110 in distributed system 100 have subscribed to. As discussed, message broker 120 is configured to forward messages to all nodes that have subscribed to topics indicated in the messages. In the JSON example above, the subject is "emitter.data.inbound.>," and all nodes subscribed to "emitter.data.inbound.>" will receive the message.

Serial number field 220 includes the sending node's GUID and a message number, which may be a unique number incremented with every message sent by the node. In the JSON example above, the sending node's GUID is CC4EE3AF921F0E1A, and the message number is 00000111. A receiving node may use the message numbers of messages it receives to identify out-of-order messages. Each of nodes 110 is configured to maintain the highest message number previously received from each other node. Each node may then identify messages that are received out of order by comparing the highest previous message number from a particular node with a current message number. For example, if the highest previous message number received from node CC4EE3AF921F0E1A is 00000109, then receipt of the message from node CC4EE3AF921F0E1A with message number 00000111 would be out of order, as message number 00000110 has yet not been received. In such a case, the receiving node may transmit an ERRM message that lists all GUIDs except CC4EE3AF921F0E1A and a request for message number 00000110. Although discussed herein primarily with respect to maintaining the highest previous message number from each other node, in alternative embodiments, other message history may also be maintained.

GUID list field 230 includes a list of GUIDs belonging to nodes which should not reply to message 200. Nodes which receive message 200 and find their own GUID in the GUID list 230 do not process the request in message 200. For example, nodes having GUIDs DF3TY2QJ068D1T4U, YR2HH6PO57W33TT, and RBN345UTOK374TM in the JSON example above would not process the message. Conversely, nodes which do not find their own GUIDs in the GUID list 230 do process message's 200 request. It should be understood that elasticity of message 200 is controlled via GUID list field 230. When GUID list field 230 is empty, all recipients of message 200 need to respond with a reply message. At the other extreme, when GUID list field 230 specifies GUIDs of all nodes 110 in distributed system 100, then message 200 is essentially a multicast message that does not require replies from any receiving nodes.

Request field 240 specifies the type of information requested from the nodes which receive message 200 and are not included in GUID list field 230. The requested data may include, e.g., state information maintained by all other nodes in the case of a new node joining the distributed system 110 (e.g., "emit data map of the whole system" in the JSON example above), or information in missing messages that need to be resent in the case of out-of-order messages.

Local changes field 250 specifies changes to the system state maintained by the sender of message 200. As discussed, nodes 110 are configured to exchange messages, such as message 200, that indicate local state changes at each of the nodes 110. When distributed system 100 is in normal operation, such messages may be transmitted by each node during every time interval (e.g., every minute) so as to synchronize the state information at the nodes 110. Aside from such messages, other messages, such as those requesting initialization data and missing messages, may also include local changes. In the JSON example above, local changes field 250 includes a "localEmitCount," which is a count of the number of times a particular client has been serviced. As discussed, distributed system 100 may employ such counts to track how much of each client's quota has been filled. For example, each client may be an application with a respective quota specifying an allowed number of service request fulfillments for a given time period, and the count for that application may be used to determine whether more requests may be serviced under the quota.

Reply subject field 260 is similar to subject field 210 and specifies the subject that a reply to message 200 should use. Nodes which receive message 200 and do not find their own GUID in GUID list 230 may transmit reply messages with subject fields 210 specifying the reply subject field 260 topic. In the JSON example above, a reply message may specify the CC4EE3AF921F0E1A.reply topic, which the sending node CC4EE3AF921F0E1A is subscribed to. As a result, message broker 120 may then forward such a reply message to the node CC4EE3AF921F0E1A.

Figure 3:
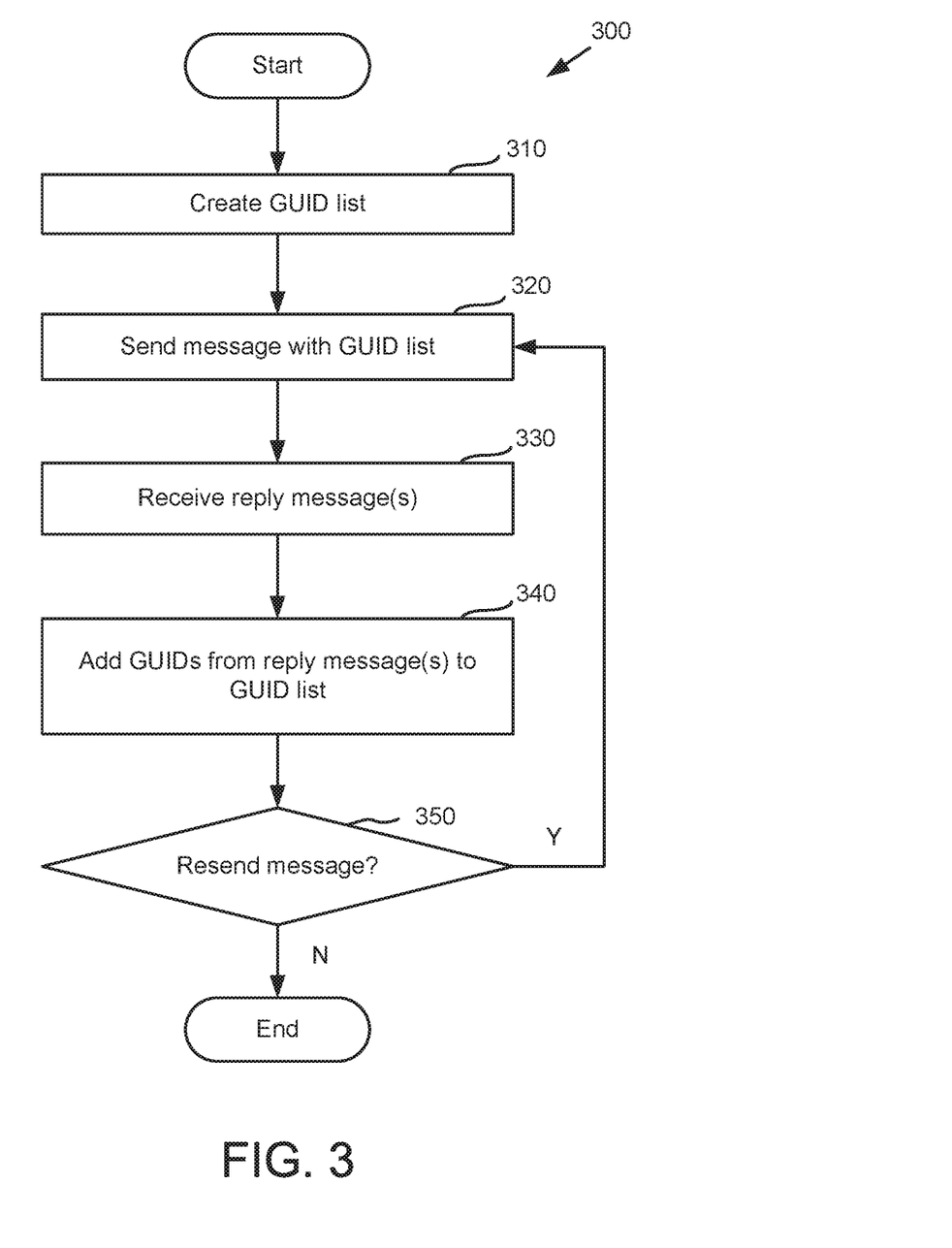
FIG. 3 illustrates a method for sending messages, according to an embodiment.

FIG. 3 illustrates a method 300 for sending request messages, according to an embodiment. As shown, method 300 begins at step 310, where node $110_i$ creates a GUID list. As discussed, GUID lists may be created to store GUIDs of nodes that previously provide requested information and are not required to reply again to the same request message. In the case of a new node joining distributed system 100, an empty GUID list may be created, as the new node is not yet aware of other nodes 110 in distributed system 100. This permits new nodes, including nodes that have gone offline (e.g., for maintenance or as a result of a crash) and are rejoining distributed system 100, to request and receive system state information without having advanced knowledge of other nodes 110 in distributed system 100. Allowing new nodes to be network agnostic in this manner improves system extensibility, as new nodes may be added to distributed system 100 relatively easily.

Conversely, a GUID list may be created that includes all other nodes' GUIDs when distributed system 100 is in normal operation, during which nodes 110 periodically exchange local state changes without expecting replies. Continuing the example from above in which system data needs to be synchronized among N nodes, only N messages, each having all GUIDs of other nodes in its GUID list, need to be sent in each time interval. This is in contrast to the $N^2$ messages required in the case of request-and-reply. It should be understood that network efficiency is improved, as the distributed system may often run in the normal operating mode.

In addition, when messages are received out of order from one or more other nodes 110, indicating that intervening messages are missing, then a respective message may be constructed for each of those nodes with a GUID list that includes GUIDs of all nodes other than one of the nodes from which messages are received out of order. In such a case, only the node that sent out-of-order messages and is not in the GUID list is required to reply with the missing message or messages. This approach overcomes limitations of the multicast communication model, in which there are no guarantees of message delivery or delivery order. Essentially, ERRM messages are multicast messages, but with the added ability to request specific information from specific peer nodes. Based on the message numbers discussed above, nodes 110 may identify received messages that are out of order and request missing messages to be resent, thereby improving reliability of distributed system 100. Although discussed herein with respect to requesting missing messages, it should be understood that no such requests may be made in cases where, e.g., the missing messages are not actually needed.

At step 320, node $110_i$ sends a message with the GUID list. If node $110_i$ is a new node joining distributed system 100, then node $110_i$ may transmit a message that includes a request for system state information needed to initialize node $110_i$ and an empty GUID list indicating that all nodes receiving the message should reply. In such a case, the request for initialization information may be included in request field 240, and GUID list field 230 may include the empty GUID list. On the other hand, if node $110_i$ is an existing node and distributed system 100 is in normal operation, then node $110_i$ may periodically send a message with its local state changes and a GUID list that includes GUIDs of all other nodes 110. When messages are received from another node out of order, node $110_i$ may send a message with a request for missing message(s) in request field 240 and GUIDs in GUID list field 230 of all nodes other than the other node from which messages are received out of order. In one embodiment, node $110_i$ may send a separate message with one missing GUID (and all other GUIDs listed) to each node from which missing message(s) are requested, so that the particular node with the missing GUID in each such message replies to the request. It may also happen that more than one node sent missing messages with the same serial numbers, in which case node $110_i$ may send a single message requesting messages with those serial numbers and specifying all GUIDs of nodes other than those which sent the missing messages.

In one embodiment, the message sent at step 320 may also include local state change information added to local changes field 250. Such local state changes may be sent with every message so that nodes 110 in distributed system 100 are able to maintain synchronized state information of the overall distributed system 100. When requesting missing messages or initialization information, the local state change information is included to essentially piggyback off of the request so as to also transmit local state change information. In one embodiment, the distributed system 100 may employ counts to track how much of clients' service request quotas have been filled, and messages may be sent with state change information indicating the locally maintained counts after clients are serviced at the local node $110_i$. Such local counts after clients are serviced by node $110_i$ will differ from the counts maintained by other nodes 110, and each of the nodes 110 may use the counts received from other nodes to update their locally maintained count information of other nodes.

At step 330, node $110_i$ receives reply message(s). In the case of a new node joining distributed system 100, message broker 120 is configured to forward the message sent at step 320 to all other nodes 110 in distributed system 100, which may then respond with reply messages including state information that they maintain. It should be understood that some of the state information received from different nodes may be the same, but there is no harm to receiving duplicate data. In the case of messages received out of order and requests being made for missing messages, other nodes 110 that receive such requests and are not listed in GUID list field 240 may reply with the missing messages. No replies are required when distributed system 100 is in normal operation, in which each node broadcasts messages with local state changes and all other nodes' GUIDs in GUID list field 240.

At step 340, node $110_i$ adds GUIDs from the reply message(s) to the GUID list created at step 310. In the case of a new node joining distributed system 100 and expecting reply messages including state information from every other node 110, when receiving replies, the new node builds its GUID list by adding GUIDs extracted from serial number field 220 of all reply messages to the GUID list. In the case of messages received out of order from another node and a request being made for the missing message(s), the GUID of the other node that is required to reply with the missing message(s) is first removed from the GUID list. Then, when the missing message(s) are received as a reply or replies, node $110_i$ adds the GUID extracted from serial number field 220 of the received reply or replies back to the GUID list.

In one embodiment, node $110_i$ may maintain in its memory a data structure that keeps track of which nodes have replied to which types of requests, and such a data structure may be used to determine the GUIDs that need to be added to or removed from the GUID list. In another embodiment, node $110_i$ may also extract the message number from serial number field 220 of reply messages and keep track of the highest message number from each other node 110 so that out-of-order messages may be identified.

At step 350, node $110_i$ determines whether to resend the message sent at step 320. For a new node joining distributed system 100, node $110_i$ may resend the message requesting system state information (e.g., a predefined number of times), in case any of the other nodes 110 did not receive the previously sent message. For messages received out of order and a message being sent requesting missing messages, node $110_i$ may need to resend the message with requests for messages that are still missing, from nodes that do not reply to the initial message requesting the missing messages.

If node $110_i$ determines at step 350 that the message does not need to be resent, then method 300 ends. Otherwise, if node $110_i$ determines that the message needs to be resent, then method 300 returns to step 320, where node $110_i$ sends a message with the GUID list. It should be understood that the GUID list has been updated at step 340 to include GUIDs of nodes that previously replied. As a result, those nodes that previously replied will find their GUIDs in the GUID list and will not reply again when they receive the later message.

Figure 4:
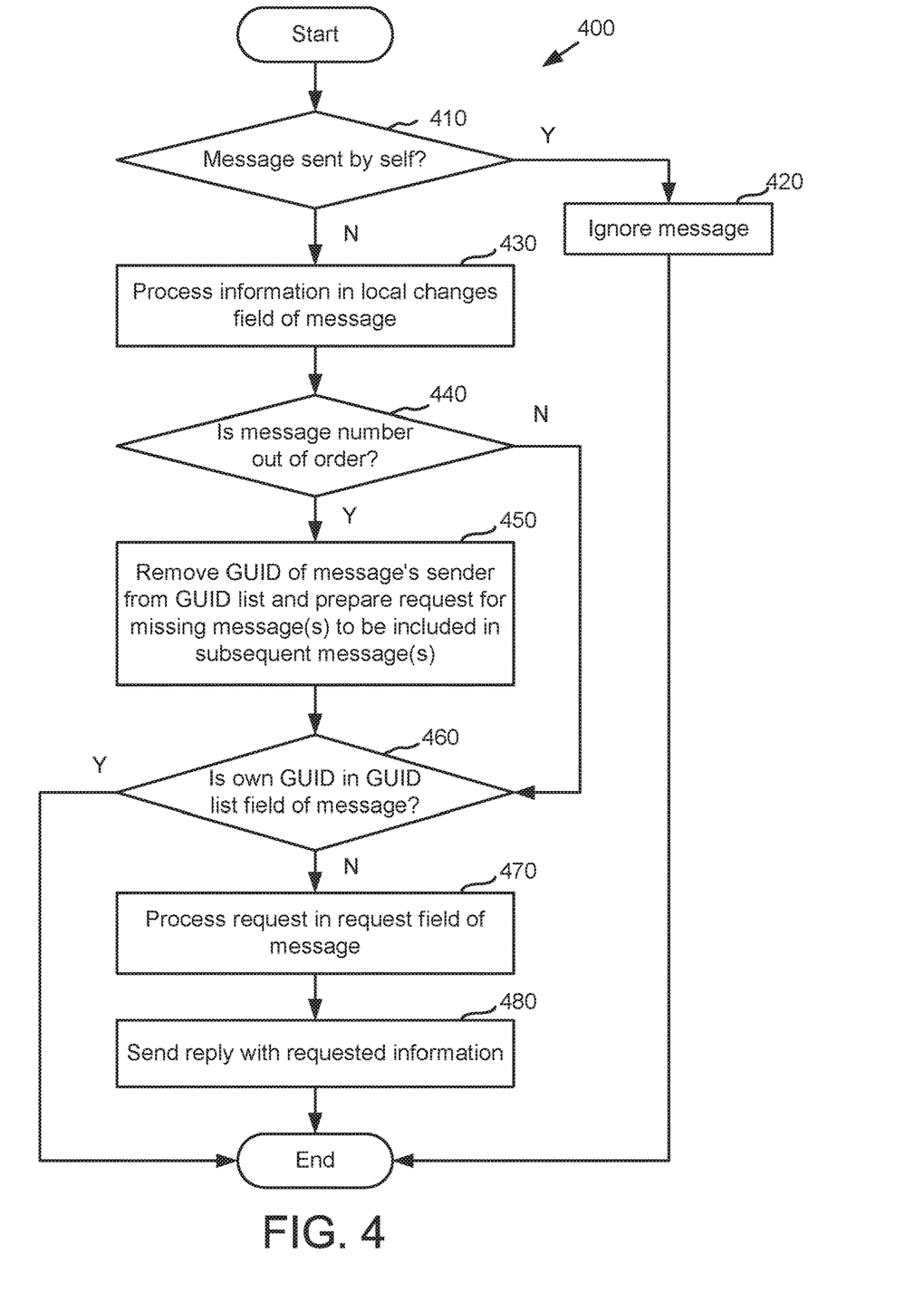
FIG. 4 illustrates a method for processing received messages, according to an embodiment.

FIG. 4 illustrates a method 400 for processing a received message, according to an embodiment. As shown, method 400 begins at step 410, where node $110_i$ determines whether the received message was sent by itself. As discussed, message broker 120 forwards messages to all nodes in distributed system 100 that have subscribed to the messages' topics. Node $110_i$ may subscribe to some of the same topic(s) as the messages it sends. In such cases, node $110_i$ may determine, based on the GUID in serial number field 220, that it is the sender of a received message and ignore the message at step 420.

If node $110_i$ instead determines that it was not the sender of the received message, then at step 430, node $110_i$ processes the information in local changes field 250 of the received message. As discussed, each message may include local state change information so that nodes 110 in distributed system 100 are able to maintain synchronized state information (e.g., synchronized counts tracking how much of clients' service request quotas have been filled, etc.) of the overall distributed system 100. Local state information may change as clients are serviced, and each node 110 adds such local state information that has changed to messages sent to other nodes 110 so that those other nodes 110 may update their own state information.

At step 440, node $110_i$ determines if the message number in serial number field 220 is out of order. As discussed, each of the nodes 110 keeps track of the highest message number previously received from each other node so that later out-of-order messages may be identified. Node $110_i$ may determine that the message number in serial number field 220 is out of order if a comparison of this message number with the highest previous message number from the same sending node indicates that one or more messages have message numbers between the highest previous message number and the message number in serial number field 220. As messages that are sent should be consecutively numbered, the messages having message numbers between the highest previous message number and the message number in serial number field 220 are messages that have been sent but not received by node $110_i$, i.e., the messages are missing.

If node $110_i$ determines at step 440 that the message number in serial number field 220 is out of order, then at step 450, node $110_i$ removes the GUID of the message's sender from a GUID list created by node $110_i$, discussed above with respect to method 300. In addition, node $110_i$ prepares a request for the missing message(s) to be included in subsequent message(s) sent by node $110_i$, the subsequent message(s) including the GUID list with the GUID of the message's sender removed. In one embodiment, node $110_i$ may send a separate message with one missing GUID (and all other GUIDs listed) to each node from which missing message(s) are requested, so that the particular node with the missing GUID in each such message replies to the request. If more than one node sent missing messages with the same serial numbers, then node $110_i$ may send a single message requesting messages with those serial numbers and specifying all GUIDs of nodes other than those which sent the missing messages.

At step 460, node 110$_i$ determines if its own GUID is included in the GUID list field 240 of the received message. As discussed, GUIDs in GUID list field 240 indicate nodes 110 that should not reply to the received message. If node 110$_i$ determines its own GUID is included in GUID list field 240 of the received message, then node 110$_i$ takes no further action.

On the other hand, if node 110$_i$ determines that its own GUID is not included in GUID list field 240 of the received message, then at step 470, node 110$_i$ processes the request in request field 240 of the received message. As discussed, the request may be, e.g., a request for a missing message or a request for all local state information needed for initialization. At step 480, node 110$_i$ sends a reply which includes the requested information.

Advantageously, techniques disclosed herein provide an ERRM messaging protocol in which messages are forwarded to all nodes in the distributed system, but replies are required only as needed by excluding GUIDs of nodes which need to reply from the messages' GUID lists. The disclosed approach has the multicast model's advantage of sending messages to groups of nodes, thereby reducing network traffic. This is particularly the case during normal operation in which each node periodically sends a message to other nodes with a GUID list specifying all of the other nodes, none of which are required to respond. When system data needs to be synchronized among N nodes, only N such messages need to be sent per time interval, rather than the (approximately) $N^2$ messages as in the case of request-and-reply. The ERRM messaging protocol also has the request-and-reply model's advantage of guaranteeing delivery and ordering of messages by requiring specific nodes (e.g., nodes which have not previously replied to a request or nodes that sent missing messages) to reply to the current message. This is achieved by removing those nodes that are required to respond from the GUID list specifying nodes that do not need to respond. Further, as the ERRM messaging protocol uses peer-to-peer network configurations in which each node is equal to other nodes, there is no single point of failure as in master/slave network configurations. Nodes that go down (e.g., for maintenance purposes or as a result of a crash) may already have transmitted their local state information to other nodes in the distributed system, after which those nodes may reacquire the system state information when rejoining the distributed system as new nodes. In addition, nodes seeking to join the system may be network agnostic and simply send a request message with an empty GUID list, making it relatively easy to add new nodes.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for a node in a distributed system to process a message from a sender node, comprising:
   receiving the message sent to a group of nodes in the distributed system at the node in the distributed computer system, wherein the message includes a request, a message number and a field reserved for a list of identifiers of selected nodes in the distributed system from which replies are not required, wherein the selected nodes do not include all the nodes in the group of nodes;
   responsive to determining that the message number of the message is out of order based on the highest message number of previous messages from the sender node:
      removing an identifier of the sender node from the list of identifiers in the message;
      preparing a subsequent message including a request for at least one missing message with a lower message number than the message number of the message and the list of identifiers with the identifier of the sender node removed; and
      sending the subsequent message to the group of nodes; and
   responsive to determining that the received message does not include an identifier associated with the node that received the message:
      processing the request, and
      transmitting a reply to the request.

2. The method of claim 1, further comprising, processing data included in the received message.

3. The method of claim 2, wherein:
   the data indicates local changes at another node; and
   the reply includes data indicating local changes at the node.

4. The method of claim 3, wherein the local changes at the node and the local changes at the other node include changes to degrees of fulfillment of quotas assigned to clients.

5. The method of claim 1, wherein:
   the request is for all data needed to initialize a node which sent the received message; and
   the list includes an empty list that indicates that all nodes in the distributed system receiving the message are required to reply.

6. The method of claim 1, wherein:
   the request is for a message with a specified message identifier to be resent; and
   the identifiers of all nodes from which replies are not required includes identifiers associated with all but one node which previously sent the message having the specified message identifier.

7. The method of claim 1, wherein:
   the received message is one of a plurality of messages sent periodically in corresponding time intervals.

8. The method of claim 1, further comprising, ignoring received messages sent by the node itself.

9. A non-transitory computer-readable storage medium containing a program which, when executed by one or more processors, performs operations for a node in a distributed system to process a message from a sender node, the operations comprising:
   receiving the message sent to a group of nodes in the distributed system at the node in the distributed computer system, wherein the message includes a request, a message number and a field reserved for a list of identifiers of selected nodes in the distributed system from which replies are not required, wherein the selected nodes do not include all the nodes in the group of nodes;
   responsive to determining that the message number of the message is out of order based on the highest message number of previous messages from the sender node:
      removing an identifier of the sender node from the list of identifiers in the message;
      preparing a subsequent message including a request for at least one missing message with a lower message number than the message number of the message and the list of identifiers with the identifier of the sender node removed; and
      sending the subsequent message to the group of nodes; and
   responsive to determining that the received message does not include an identifier associated with the node that received the message:
      processing the request, and
      transmitting a reply to the request.

10. The non-transitory computer-readable storage medium of claim 9, the operations further comprising, processing data included in the received message.

11. The non-transitory computer-readable storage medium of claim 10, wherein:
the data included in the received massage indicates local changes at another node; and
the reply includes data indicating local changes at the node.

12. The non-transitory computer-readable storage medium of claim 11, wherein the local changes at the node and the local changes at the other node include changes to degrees of fulfillment of quotas assigned to clients.

13. The non-transitory computer-readable storage medium of claim 9, wherein:
the request is for all data needed to initialize a node which sent the received message; and
the list includes an empty list that indicates that all nodes in the distributed system receiving the message are required to reply.

14. The non-transitory computer-readable storage medium of claim 9, wherein:
the request is for a message with a specified message identifier to be resent; and
the identifiers of all nodes from which replies are not required includes identifiers associated with all but one node which previously sent the message having the specified message identifier.

15. The non-transitory computer-readable storage medium of claim 9, wherein:
the received message is one of a plurality of messages sent periodically in corresponding time intervals.

16. The non-transitory computer-readable storage medium of claim 9, the operations further comprising, ignoring received messages sent by the node itself.

17. A system, comprising:
a processor;
a memory, wherein the memory includes a program executable in the processor to perform operations for the system to process a message from a sender node, the operations comprising:
receiving the message sent to a group of computer systems at the system, wherein the message includes a request, a message number and identifiers of selected computer systems from which replies are not required, wherein the selected computer systems do not include all the computer systems in the group of computer systems,
responsive to determining that the message number of the message is out of order based on the highest message number of previous messages from the sender node:
removing an identifier of the sender node from the list of identifiers in the message;
preparing a subsequent message including a request for at least one missing message with a lower message number than the message number of the message and the list of identifiers with the identifier of the sender node removed; and
sending the subsequent message to the group of nodes; and
responsive to determining that the received message does not include an identifier associated with the system that received the message:
processing the request; and
transmitting a reply to the request.

18. The system of claim 17, wherein, either:
the request is for all data needed to initialize a computer system which sent the received message, and no identifiers of computer systems from which replies are not required are included in the received message; or
the request is for a message with a specified message identifier to be resent, and the identifiers of all computer systems from which replies are not required includes identifiers associated with all but one computer system which previously sent the message having the specified message identifier.

* * * * *